US010776628B2

(12) United States Patent
Escorcia et al.

(10) Patent No.: US 10,776,628 B2
(45) Date of Patent: Sep. 15, 2020

(54) VIDEO ACTION LOCALIZATION FROM PROPOSAL-ATTENTION

(71) Applicant: QUALCOMM Incorporated, San Diego, CA (US)

(72) Inventors: Victor Augusto Escorcia, Thuwal (SA); Mihir Jain, Amsterdam (NL); Amirhossein Habibian, Amsterdam (NL); Cornelis Gerardus Maria Snoek, Volendam (NL)

(73) Assignee: Qualcomm Incorporated, San Diego, CA (US)

( * ) Notice: Subject to any disclaimer, the term of this patent is extended or adjusted under 35 U.S.C. 154(b) by 64 days.

(21) Appl. No.: 16/152,301

(22) Filed: Oct. 4, 2018

(65) Prior Publication Data

US 2019/0108399 A1 Apr. 11, 2019

Related U.S. Application Data

(60) Provisional application No. 62/569,248, filed on Oct. 6, 2017.

(51) Int. Cl.
*G06K 9/00* (2006.01)
*G06N 3/08* (2006.01)
*G06N 3/04* (2006.01)
*G06K 9/62* (2006.01)

(52) U.S. Cl.
CPC ..... *G06K 9/00718* (2013.01); *G06K 9/00684* (2013.01); *G06K 9/00744* (2013.01); *G06K 9/00765* (2013.01); *G06K 9/6267* (2013.01); *G06N 3/0445* (2013.01); *G06N 3/0454* (2013.01); *G06N 3/084* (2013.01); *G06K 9/6259* (2013.01); *G06K 9/6263* (2013.01); *G06K 2009/00738* (2013.01)

(58) Field of Classification Search
None
See application file for complete search history.

(56) References Cited

U.S. PATENT DOCUMENTS

| 9,358,685 | B2 | 6/2016 | Meier et al. |
| 9,384,396 | B2 | 7/2016 | Loce et al. |
| 9,776,323 | B2 | 10/2017 | O'Sullivan et al. |
| 2015/0030252 | A1* | 1/2015 | Corso ................ G06K 9/00744 382/197 |
| 2017/0169315 | A1* | 6/2017 | Vaca Castano ...... G06K 9/3233 |

(Continued)

OTHER PUBLICATIONS

Hou R., et al., "Tube Convolutional Neural Network (T-CNN) for Action Detection in Videos", Aug. 2, 2017 (Aug. 2, 2017), 11 Pages, XP055543546, Retrieved from the Internet: URL: https://arxiv.org/pdf/1703.10664.pdf [retrieved on Jan. 17, 2019].

(Continued)

*Primary Examiner* — Fayyaz Alam
(74) *Attorney, Agent, or Firm* — Seyfarth Shaw LLP

(57) ABSTRACT

A method for processing a sequence of frames includes receiving a sequence of frames and multiple action proposals for the sequence of frames. The method also includes generating a representation of the sequence of frames and pooling the representation around each of the action proposals. The method further includes classifying the action proposals based on the pooled representations and controlling a device based on the classifying.

30 Claims, 10 Drawing Sheets

(56) References Cited

U.S. PATENT DOCUMENTS

| | | | |
|---|---|---|---|
| 2017/0262996 A1* | 9/2017 | Jain | G06T 7/143 |
| 2017/0308754 A1 | 10/2017 | Torabi et al. | |
| 2018/0053057 A1* | 2/2018 | De Souza | G06K 9/00718 |
| 2019/0266407 A1* | 8/2019 | Gupta | G06K 9/6273 |
| 2019/0294881 A1* | 9/2019 | Polak | G06N 3/08 |
| 2019/0325275 A1* | 10/2019 | Lee | G06K 9/66 |

OTHER PUBLICATIONS

International Search Report and Written Opinion—PCT/US2018/054556—ISA/EPO—Jan. 24, 2019.

* cited by examiner

VIDEO ACTION LOCALIZATION FROM PROPOSAL-ATTENTION

CROSS-REFERENCE TO RELATED APPLICATION

The present application claims the benefit of U.S. Provisional Patent Application No. 62/569,245 filed on Oct. 6, 2017, and titled "VIDEO ACTION LOCALIZATION FROM PROPOSAL-ATTENTION," the disclosure of which is expressly incorporated by reference herein in its entirety.

BACKGROUND

Field

Aspects of the present disclosure generally relate to action localization and, more particularly, to systems and methods for action localization in a sequence of frames.

Background

An artificial neural network, which may comprise an interconnected group of artificial neurons (e.g., neuron models), is a computational device, or represents a method to be performed by a computational device.

An artificial neural network (ANN) may be specified to identify a set of spatiotemporal locations that correspond to an action (e.g., action proposals) in a sequence of frames, such as a video. That is, given the action proposals, the ANN may identify the spatiotemporal locations of the action in the frame. Identifying the spatiotemporal locations of the action may be referred to as action localization or localizing the action. The action may be localized based on the classification. Action classification may be used for various applications in internet protocol (IP) cameras, Internet of Things (IoT), autonomous driving, and/or service robots. The action classification applications may improve the understanding of object paths for planning. For example, during autonomous driving, action classification is used to avoid collisions with pedestrians and cyclists.

Conventional systems may use supervised learning to train a neural network for action classification. Supervised learning uses training videos, class labels, and ground-truth boxes to train a neural network via backpropagation. Specifically, for supervised learning, ground-truth boxes are generated from actions annotated by a user in each frame of a video. During training, the classified frames are compared against the ground-truth boxes. The weights of the network may be adjusted to minimize the differences between the ground-truth and the classification.

Using supervised learning for a neural network is often time consuming and error-prone. For example, the annotation is time consuming, tedious, and error-prone. Weakly supervised learning may reduce training time. However, weakly supervised learning has a lower performance (e.g., lower classification accuracy) than supervised learning. Furthermore, weakly supervised learning cannot be coupled with a representation of a video obtained by a feature extractor. There is a need to improve methods and systems for video localization.

SUMMARY

In one aspect of the present disclosure, a method for processing a sequence of frames includes receiving the sequence of frames and multiple action proposals. The method also includes generating a representation of the sequence of frames. The method further includes pooling the representation around each of the action proposals. The method still further includes classifying the action proposals based on the pooled representation. The method also includes controlling a device based on the classifying.

Another aspect of the present disclosure is directed to an apparatus including means for receiving the sequence of frames and multiple action proposals for the sequence of frames. The apparatus also includes means for generating a representation of the sequence of frames. The apparatus further includes means for pooling the representation around each of the action proposal proposals. The apparatus still further includes means for classifying the action proposals based on the pooled representation. The apparatus also includes means for controlling a device based on the classifying.

In another aspect of the present disclosure, a non-transitory computer-readable medium records program code for processing a sequence of frames. The program code is executed by a processor and includes program code to receive the sequence of frames and multiple action proposals for the sequence of frames. The program code also includes program code to generate a representation of the sequence of frames. The program code further includes program code to pool the representation around each of the action proposals. The program code still further includes program code to classifying the action proposals based on the pooled representation. The program code also includes program code to control a device based on the classification.

Another aspect of the present disclosure is directed to an apparatus for processing a sequence of frames. The apparatus has a memory and one or more processors coupled to the memory. The processor(s) is configured to receive the sequence of frames and multiple action proposals for the sequence of frames. The processor(s) is also configured to generate a representation of the sequence of frames. The processor(s) is further configured to pool the representation around each of the action proposals. The processor(s) is still further configured to classify the action proposals based on the pooled representation. The processor(s) is also configured to control a device based on the classification.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
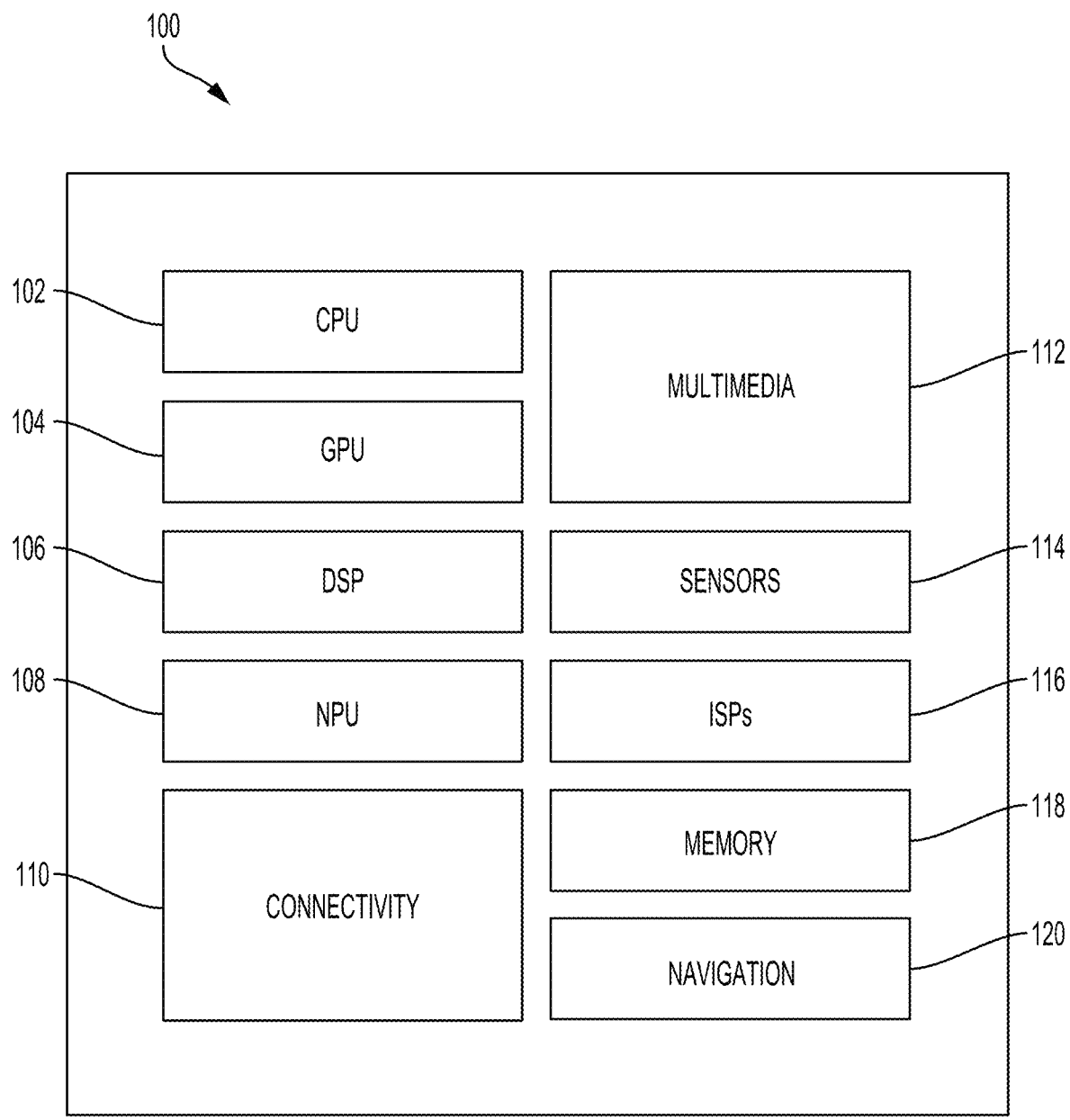
FIG. 1 illustrates an example implementation of designing a neural network using a system-on-a-chip (SOC), including a general-purpose processor in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Action localization refers to a process of classifying an action identified in an action proposal. Neural networks, and other types of systems, may be trained by supervised learning or weakly supervised learning. That is, neural networks may be trained to identify the action that is occurring at a proposal. Conventional training processes may be tedious and error-prone.

Aspects of the present disclosure are directed to a video action localization framework based on action proposals, such as actor deformation invariant action proposals. Action proposals indicate the likely action locations in each frame. The action proposal may be obtained from an action proposal generator, such as the action proposal generator described in, for example, U.S. Provisional Patent Application No. 62/568,762, titled "ACTOR DEFORMATION INVARIANT ACTION PROPOSALS," filed on Oct. 5, 2017, the disclosure of which is expressly incorporated by reference herein in its entirety. In one configuration, the action localization is performed without box level supervision.

FIG. 1 illustrates an example implementation of a system-on-a-chip (SOC) 100, which may include a central processing unit (CPU) 102 or a multi-core CPU configured to perform video action localization from proposal-attention in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, or may be distributed across multiple blocks. Instructions executed at the CPU 102 may be loaded from a program memory associated with the CPU 102 or may be loaded from a memory block 118.

The SOC 100 may also include additional processing blocks tailored to specific functions, such as a GPU 104, a DSP 106, a connectivity block 110, which may include fifth generation (5G) connectivity, fourth generation long term evolution (4G LTE) connectivity, Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs) 116, and/or navigation module 120, which may include a global positioning system.

The SOC 100 may be based on an ARM instruction set. In an aspect of the present disclosure, the instructions loaded into the general-purpose processor 102 may comprise code to receive the sequence of frames and a plurality of action proposals for the sequence of frames. The instructions loaded into the general-purpose processor 102 may also comprise code to generate a representation of the sequence of frames. The instructions loaded into the general-purpose processor 102 may further comprise code to pool the representation around each of the action proposals. The instructions loaded into the general-purpose processor 102 may also comprise code to classify the action proposals based on the pooled representation.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
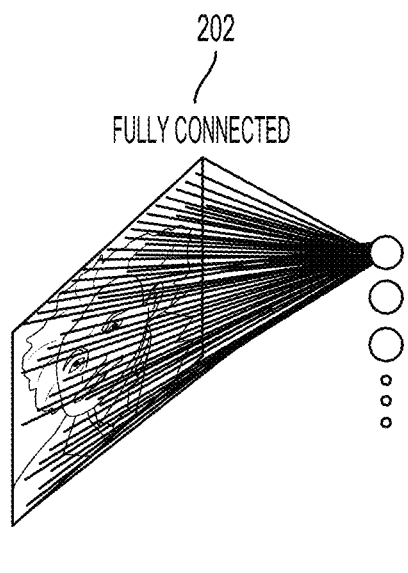
FIGS. 2A, 2B, and 2C are diagrams illustrating a neural network in accordance with aspects of the present disclosure.
Figure 2B:
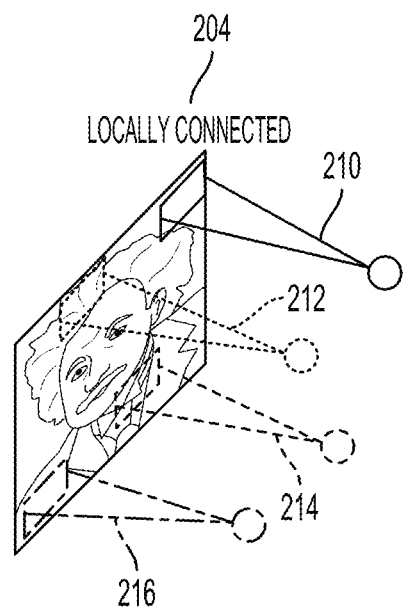

The connections between layers of a neural network may be fully connected or locally connected. FIG. 2A illustrates an example of a fully connected neural network 202. In a fully connected neural network 202, a neuron in a first layer may communicate its output to every neuron in a second layer, so that each neuron in the second layer will receive input from every neuron in the first layer. FIG. 2B illustrates an example of a locally connected neural network 204. In a locally connected neural network 204, a neuron in a first layer may be connected to a limited number of neurons in the second layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
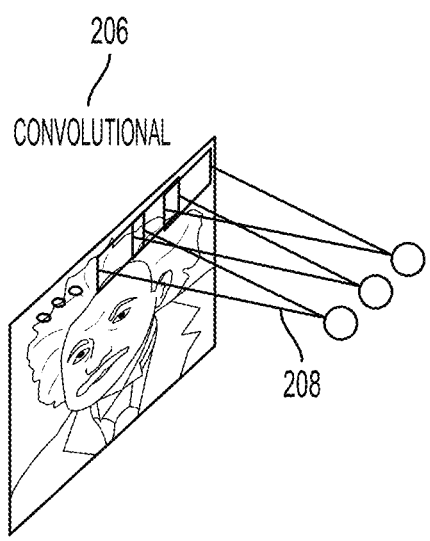

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful.

Figure 2D:
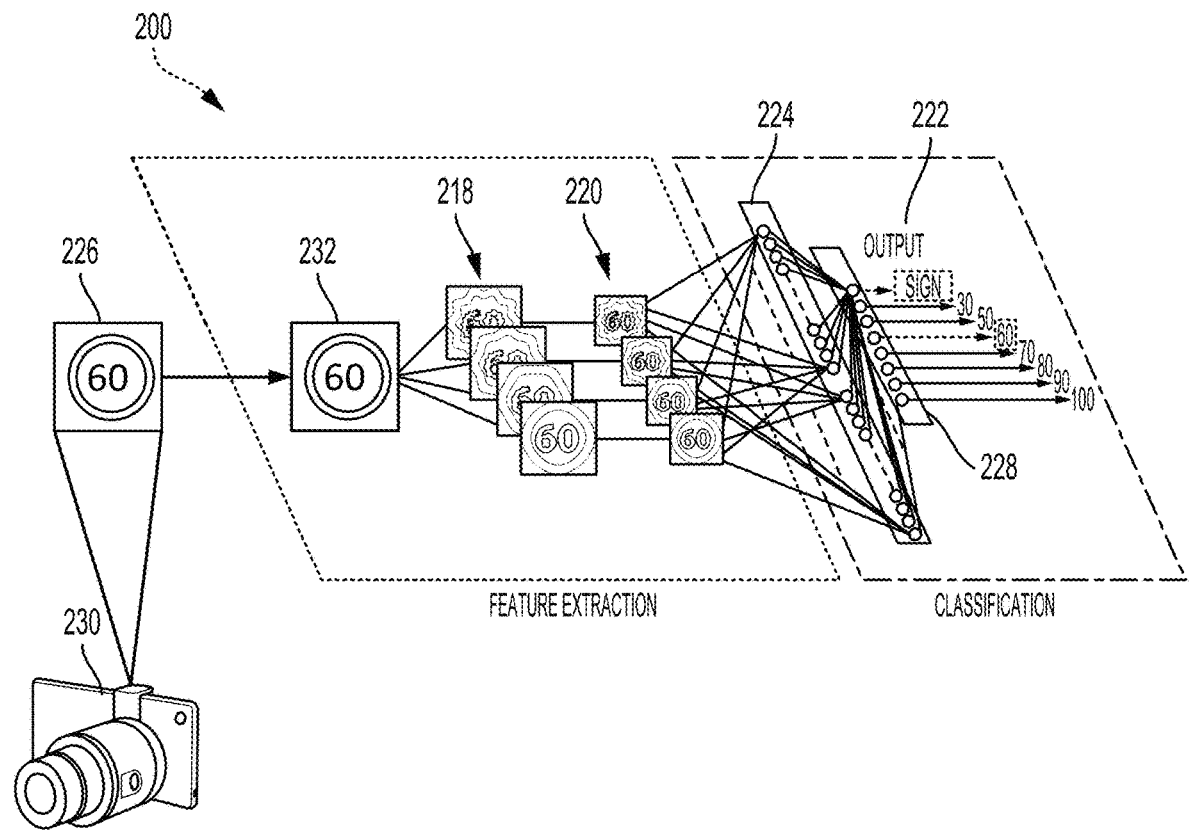
FIG. 2D is a diagram illustrating an exemplary deep convolutional network (DCN) in accordance with aspects of the present disclosure.

One type of convolutional neural network is a deep convolutional network (DCN). FIG. 2D illustrates a detailed example of a DCN 200 designed to recognize visual features from an image 226 input from an image capturing device 230, such as a car-mounted camera. The DCN 200 of the current example may be trained to identify traffic signs and a number provided on the traffic sign. Of course, the DCN 200 may be trained for other tasks, such as identifying lane markings or identifying traffic lights.

The DCN 200 may be trained with supervised learning. During training, the DCN 200 may be presented with an image, such as the image 226 of a speed limit sign, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign," "60," and "100." A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30," "40," "50," "70," "80," "90," and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 226) and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, $\max(0,x)$. Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3:
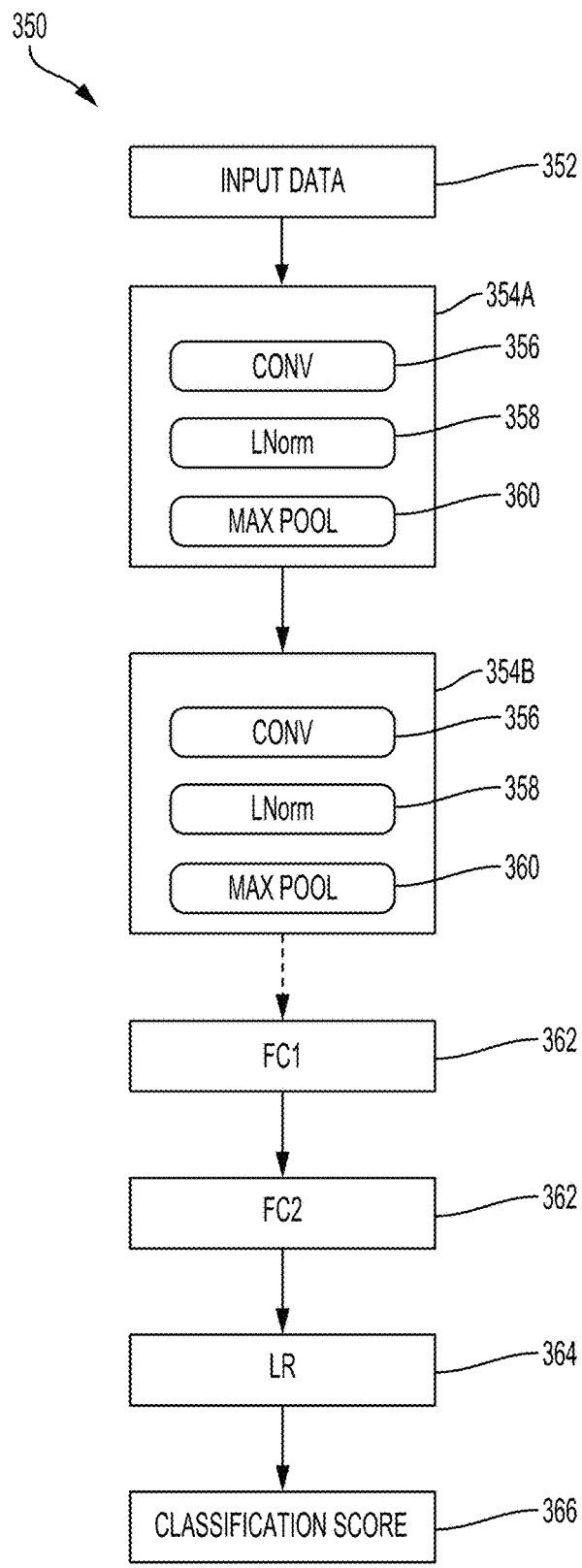
FIG. 3 is a block diagram illustrating an exemplary deep convolutional network (DCN) in accordance with aspects of the present disclosure.

FIG. 3 is a block diagram illustrating a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data to generate a feature map. Although only two of the convolution blocks 354A, 354B are shown, the present disclosure is not so limiting, and instead, any number of the convolution blocks 354A, 354B may be included in the deep convolutional network 350 according to design preference. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an SOC 100 to achieve high performance and low power consumption. In alternative embodiments, the parallel filter banks may be loaded on the DSP 106 or an ISP 116 of an SOC 100. In addition, the deep convolutional network 350 may access other processing blocks that may be present on the SOC 100, such as sensor processor 114 and navigation module 120, dedicated, respectively, to sensors and navigation.

The deep convolutional network 350 may also include one or more fully connected layers 362 (FC1 and FC2). The deep convolutional network 350 may further include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Figure 4:
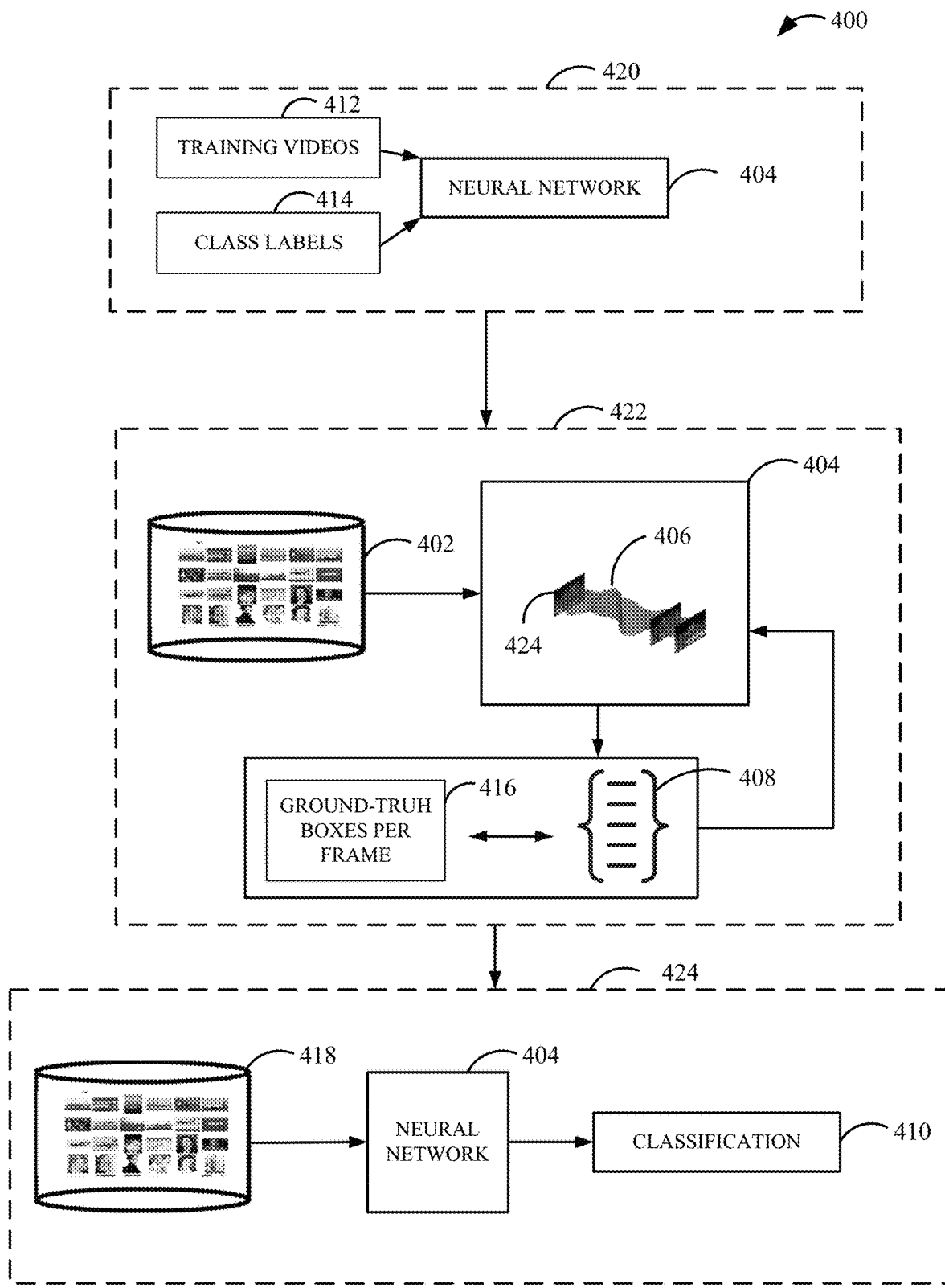
FIG. 4 illustrates an example of a process of supervised training of a neural network for action localization.

FIG. 4 illustrates an example of a process of conventional supervised training 400 of a neural network for action localization. As shown in FIG. 4, during an initial training phase 420, a neural network 404 receives a set of labeled training videos (e.g., training videos 412 and class labels 414). After the initial training phase 420, at a supervised training phase 422, a set of N training videos 402 are input to the neural network 404. The neural network 404 generates action proposals for each of the N training videos 402. FIG. 4 illustrates an example of generating action proposals 406 for one training video 424 of the N training videos 402. Based on the initial training, the neural network 404 outputs a vector representation 408 of the proposed descriptions (e.g., classifications) of the action proposals.

The vector representation 408 is compared to the ground-truth boxes 416. The neural network 404 updates network parameters based on the comparison to the ground-truth boxes 416. For example, the network parameters may be updated via backpropagation. After training, at a test phase 424, the neural network 404 may be used to classify videos. The output of the neural network 404 is a classification 410 of the action in a video 418.

As discussed above, conventional supervised learning compares the neural network's output to a ground-truth bounding box and the parameters of the neural network are updated to minimize an error between the neural network's output and the ground-truth bounding box. Aspects of the present disclosure are directed to using action proposals in an action localization system that classifies inputs without the use of ground-truth bounding boxes (e.g., box level supervision).

Figure 5A:
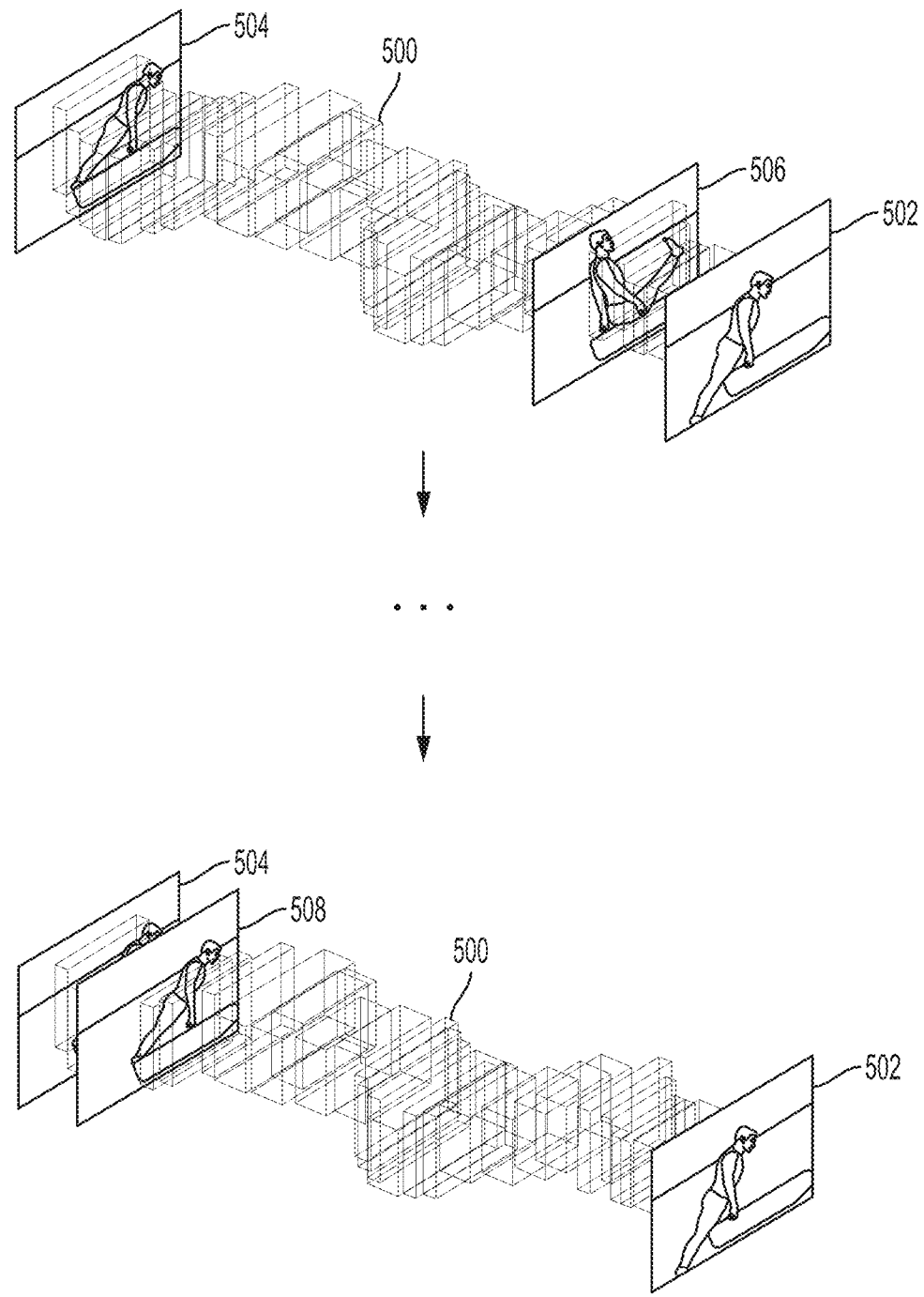
FIG. 5A illustrates an example of a tube of action proposals generated by an action proposal generator in accordance with aspects of the present disclosure

As discussed, action proposals indicate the likely action locations in each frame. The action proposal may be obtained from an action proposal generator. The action proposal may be identified by a bounding box. Over time, the sequence of bounding boxes generates a tube. FIG. 5A illustrates an example of a tube 500 generated by an action proposal generator in accordance with aspects of the present disclosure. As shown in FIG. 5A, the tube 500 is generated based on the sequence of bounding boxes between an initial frame 502 of a sequence of frames and a final frame 504 of the sequence of frames. As a location of an action changes between frames, the location of the bounding box corresponding to the action also changes between frames. For example, the location of the action changes from the first frame 502 to a second frame 506. Likewise, the location of the action changes from the second frame 506 to a third frame 508. The movement of the bounding boxes over the sequence of frames is tracked by the tube 500.

Figure 5B:
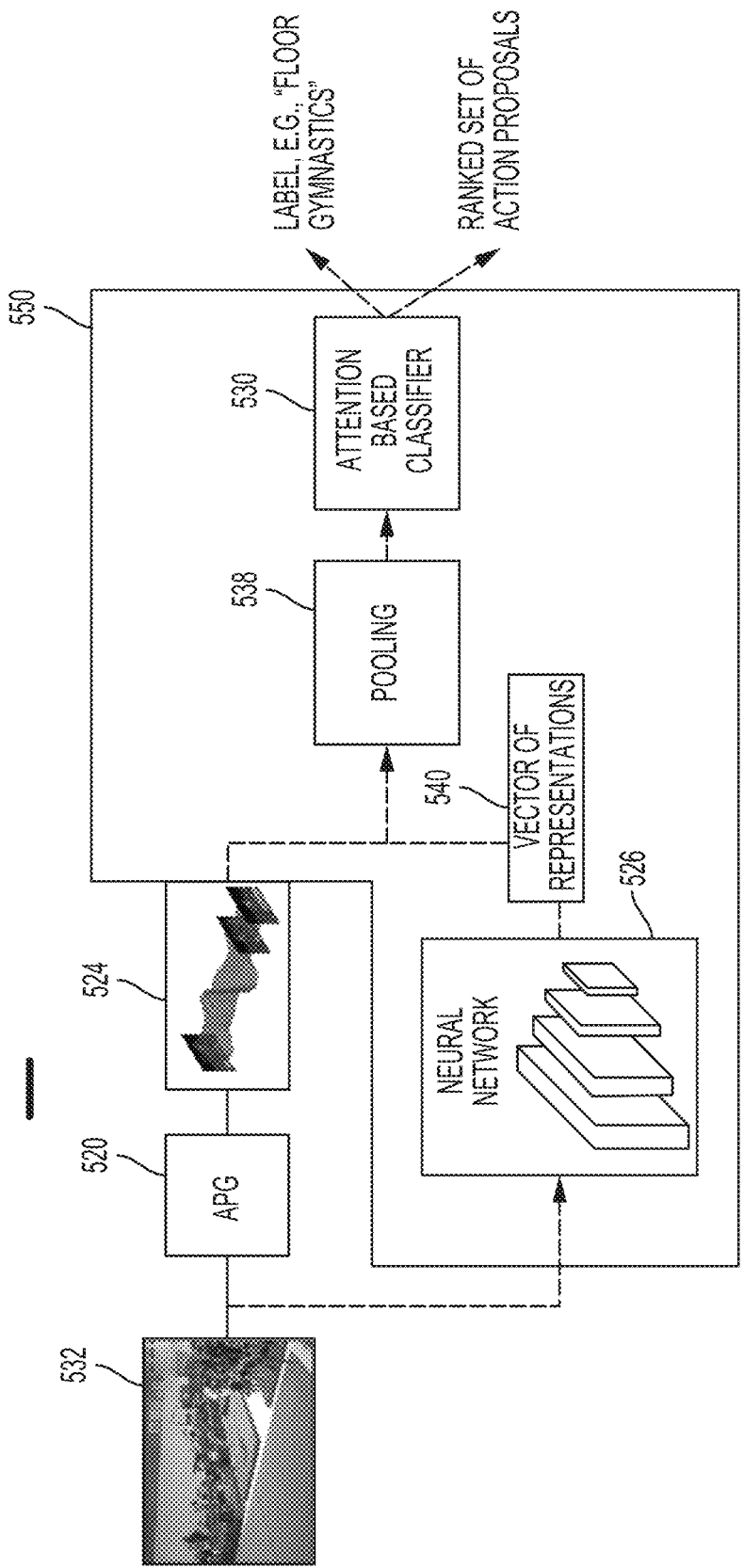
FIGS. 5B and 6 illustrate examples of action localization systems according to aspects of the present disclosure.

FIG. 5B illustrates an example of an action localization system 550 according to aspects of the present disclosure. As shown in FIG. 5B, the action localization system 550 receives a sequence of frames 532 (e.g., video) and a set of action proposals 524 as inputs. The set of action proposals 524 may be generated from the sequence of frames 532 by an action proposal generator (APG) 520. The action proposal generator 520 may be separate from the action localization system 550. Aspects of the present disclosure are not limited to a sequence of frames 532. The action localization may be performed for other types of inputs.

The sequence of frames 532 is encoded via a neural network 526, such as a convolutional neural network, to obtain features of the sequence of frames. The features may be stored in a vector. The features may be referred to as video representations. As such, the vector of features may also be referred to as a vector of representations 540. The neural network 526 may be pre-trained for video classification or other types of classification. In one configuration, a set of activations is generated by the neural network 526 from the sequence of frames 532. The activations may correspond to various regions of the sequence of frames 532. To improve the classification, adaptive pooling is used to focus on the activations regions that correspond to the action proposals.

As shown in FIG. 5B, a proposal of an interest pooling layer 538 receives the vector of representations 540 from the neural network 526. The interest pooling layer 538 also receives the set of action proposals 524. The interest pooling layer 538 may be a recurrent neural network. The pooling may be simple pooling, such as averaging or concatenation. Additionally, or alternatively, the pooling may be sophisticated, such as temporal pooling by the recurrent neural network.

Average pooling aggregates the spatio-temporal information enclosed by the set of action proposals 524 (e.g., actor tube) across the vector representation 540. In some cases, the sequence of frames 532 may include multiple actors. When the sequence of frames 532 includes multiple actors, a set of action proposals 524 may be generated for each actor. That is, a different actor tube may be generated for each actor. Furthermore, when the sequence of frames 532 includes multiple actors, average pooling may aggregate the spatio-temporal information enclosed by the set of action proposals 524 (e.g., actor tube) across the vector representation 540 corresponding to each actor.

Concatenation stacks the vector representation 540 of each box in the set of action proposals 524, thereby, forming a new vector representation with a higher dimension than the previous vector representation 540. Finally, temporal pooling applies a nonlinear recurrent transformation (e.g. long short-term memory), over all the boxes in the set of action proposals 524. Based on the temporal pooling, a discriminative sequence of states of the actors may be modeled without increasing the number of parameters of the architecture.

The video representations are pooled around the action proposals 524. For example, if the action proposals 524 designate a gymnast as an area of interest, the interest pooling layer 538 focuses only on the representations generated from the area corresponding to the gymnast. The pooled representations are then classified at a classification layer 530. The output of the action localization system 550 is a video label, such as "floor gymnastics." At test time (e.g., real world deployment), the classification layer 530 may also rank each action proposal of the set of action proposals 524. That is, each frame may include multiple action proposals (e.g., bounding boxes). The action proposals of each frame may be ranked based on the correlation of each action proposal to the label. The highest ranking action proposal of each frame may be used to localize the action in the frame. The ranking improves an accuracy of the localization.

The action localization system 550 may be an end-to-end system. That is, during training, the neural network 526 of the action localization system 550 is trained using video labels and does not use ground-truth boxes. The video representation may be pre-trained on an auxiliary data set, if necessary. For example, the neural network 526 may be pre-trained on videos with a specific type of action (e.g., playing basketball) to fine tune the video representation. Still, the action localization system 550 is trained end-to-end. That is, weights and/or learnable parameters of the neural network 526 and the classification layer 530 (e.g., attention based classifier) may be updated during the training stage.

Figure 6:
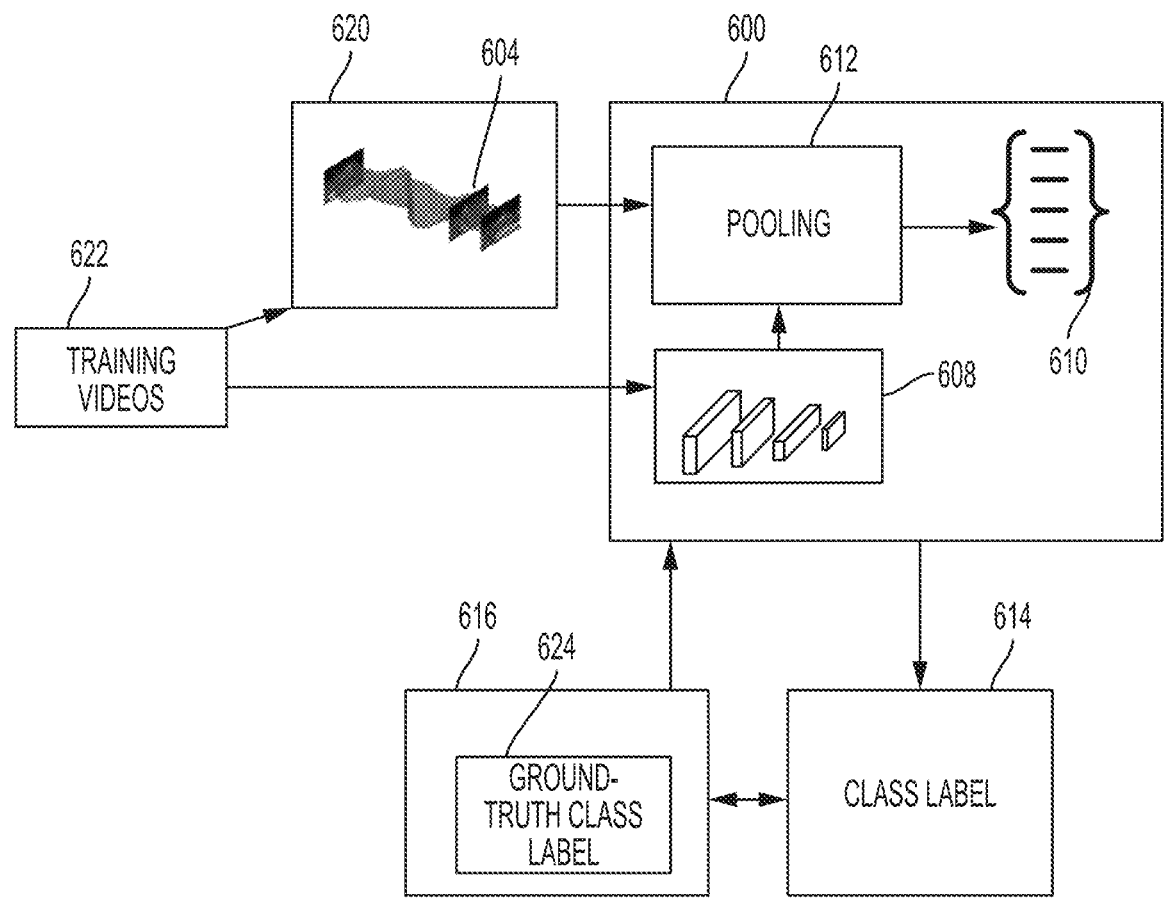

FIG. 6 illustrates an example of training an action localization system 600 according to aspects of the present disclosure. As shown in FIG. 6, during training, the action localization system 600 receives training videos 622 and corresponding ground-truth class labels 624. Action proposals 604 are generated for each video 622. The action proposals 604 may be generated from an action proposal generator 620 that is separate from the action localization system 600. Alternatively, the action proposal generator 620 is a component of the action localization system 600.

The action localization system 600 generates video representations using a neural network 608, such as a convolutional neural network. A pooling layer 612 pools the action proposals 604 with the video representations to generate pooled video representations. A set of proposal descriptions 610 are generated from the pooled video representations. Each proposal description of the set of proposal descriptions 610 provides an action and a confidence of the action in an action proposal 604. Based on the set of proposal descriptions 610, the action localization system 600 classifies each training video 622 and outputs a class label 614 (e.g., classification) corresponding to the training video 622. Each training video 622 may have a different class label 614.

During training, an error module 616 compares the class label 614 to the ground-truth class label 624. The difference between the class label 614 and the ground-truth class label 624 is considered an error. The error module 616 uses the error to adjust the parameters of the action localization system 600 to minimize the error. Based on the adjusted parameters, the action localization system 600 may modify the pooling, the set of proposal descriptions 610, or other parameters as discussed. The training may continue until the error is at or below an error threshold. It is noted that the ground-truth class labels 624 are different from ground-truth bounding boxes. The training updates parameters of the neural network and the fully connected layer in the attention based classifier.

Aspects of the present disclosure are also directed to an attention based classifier that selects the most relevant proposal to improve classification. During training, the parameters may be adjusted to improve the selection of the most relevant proposal. The classifier may be pre-trained for video classification based on action proposals. As discussed above, the training may use video level annotation without ground-truth boxes. In one configuration, the classifier ranks action proposals based on an output of a fully connected layer of the classifier. The action proposals may be ranked without explicit supervision.

Figure 7:
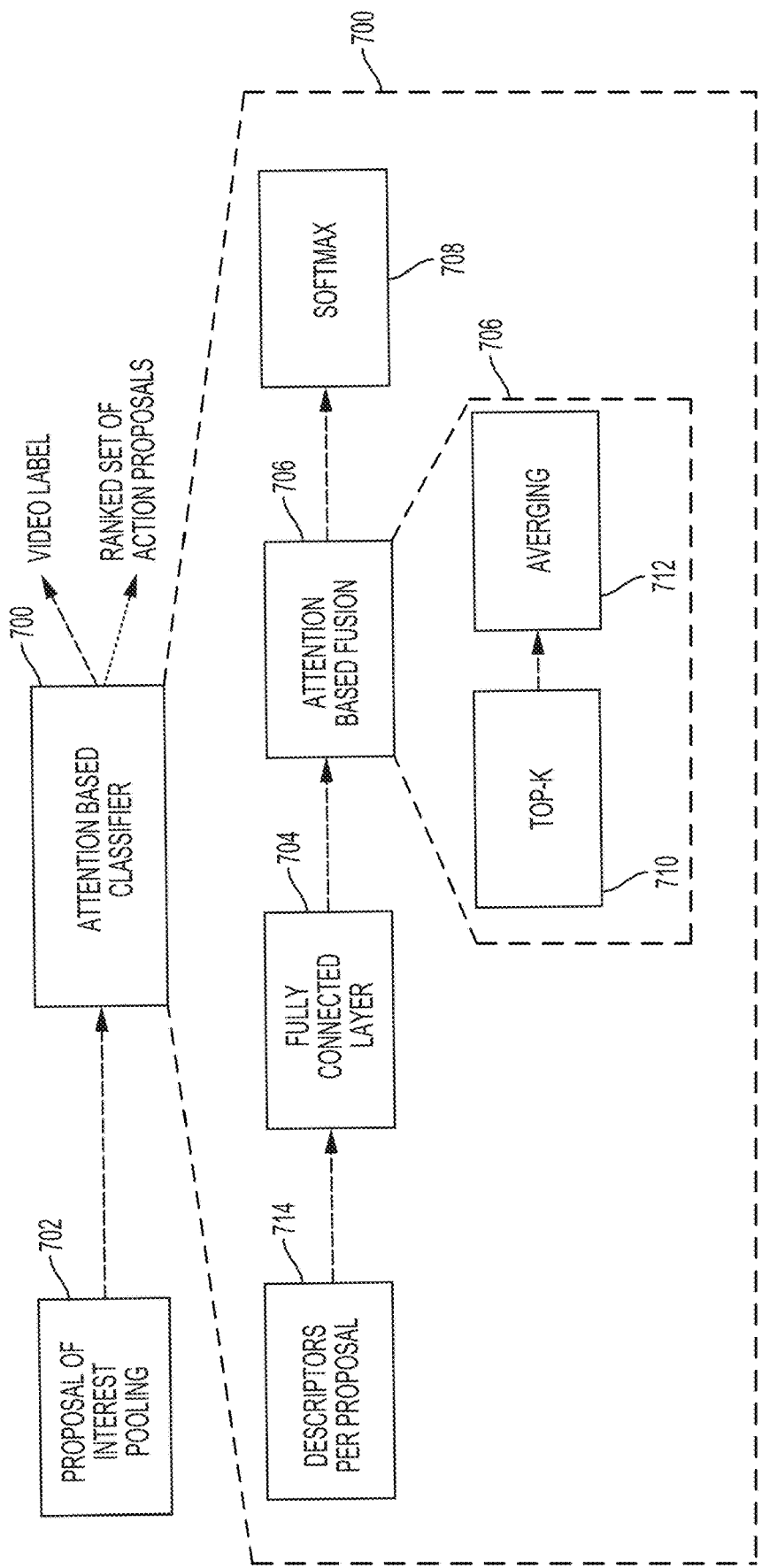
FIG. 7 illustrates an example of an attention based classifier according to aspects of the present disclosure.

FIG. 7 illustrates an example of an attention based classifier 700 according to aspects of the present disclosure. As shown in FIG. 7, the attention based classifier 700 receives an input from a proposal of an interest pooling layer 702 and outputs a label (e.g., classification). The proposal of the interest pooling layer 702 is generated from a sequence of frames and a vector of representations of the sequence of frames (see FIGS. 5B and 6). As previously discussed, the proposal of interest pooling layer 702 pools the representations around the action proposals to improve an accuracy of the classification. The representations may be referred to as features or activations.

A set of proposal descriptions 714 (e.g., descriptors for each proposal) are generated for each action proposal from the pooled video representations. Each proposal descriptor may be generated based on pooled activations (e.g., representations) that are within the area (e.g., bounding box) of the action proposal. In addition, each proposal description classifies an action in each of the action proposals. Each classification may have a proposal score (e.g., classification score). The proposal score is a score that indicates the correlation of the classification to a class of interest for the sequence of frames. For example, in a video of a basketball game, an action proposal may include a descriptor for "rebounding the basketball" and another descriptor for "slam dunk." Although both descriptors are related to basketball, if the class of interest is a player dunking the ball, the descriptor for "slam dunk" should have a higher proposal score than the descriptor for "rebounding the basketball."

The classifier 700 also includes a fully connected layer 704 that receives the descriptors for each proposal 714. That is, the fully connected layer 704 receives descriptors of all action proposals, in the form of a matrix N×D, where N is the number of action proposals and D is the feature dimension from the descriptors for each proposal 714. The fully connected layer 704 outputs a matrix N×C representing the classification scores for C actions of interest for all proposals. The C actions of interest for each of the N action proposals may be represented in a vector. For each action proposal, a high classification score for an action of interest correlates with high confidence of the presence of a particular action.

An attention based fusion layer 706 receives the output of the fully connected layer 704 (e.g., the matrix N×C representing the classification scores among C actions of interest for all of the proposals). A softmax layer 708 receives an input from the attention based fusion layer 706 and performs a classification based on the received input. The softmax layer 708 may receive the average score of each class. FIG. 7 illustrates an expanded view of the attention based fusion layer 706 according to aspects of the present disclosure. The attention based fusion layer 706 is based on a hard-attention model, such that only the k most relevant action proposals are used for classification. As shown in FIG. 7, the attention based fusion layer 706 includes a top-k layer 710 and an averaging layer 712.

In one configuration, rather than classifying a video based on the classifications in all of the action proposals, the classification is performed based on a set of k action proposals. The top-k layer 710 selects the action proposals having a proposal score for an action that is greater than a proposal score threshold, such that the top-k action proposals are selected. For example, if the proposal score threshold is 80, the top-k layer 710 selects each action proposal with a proposal score that is greater than or equal to 80 for a given action.

As discussed above, the proposal scores are output by the fully connected layer 704. The proposal scores represent the confidence of the proposal belonging to a certain class. The action proposals may be ranked based on the selection from the top-k layer 710. The scores of the selected proposals are averaged at the averaging layer 712 that computes a global confidence score for a video in the actions of interest area. The averaging may be performed for each action category over the top-k proposals.

Figure 8:
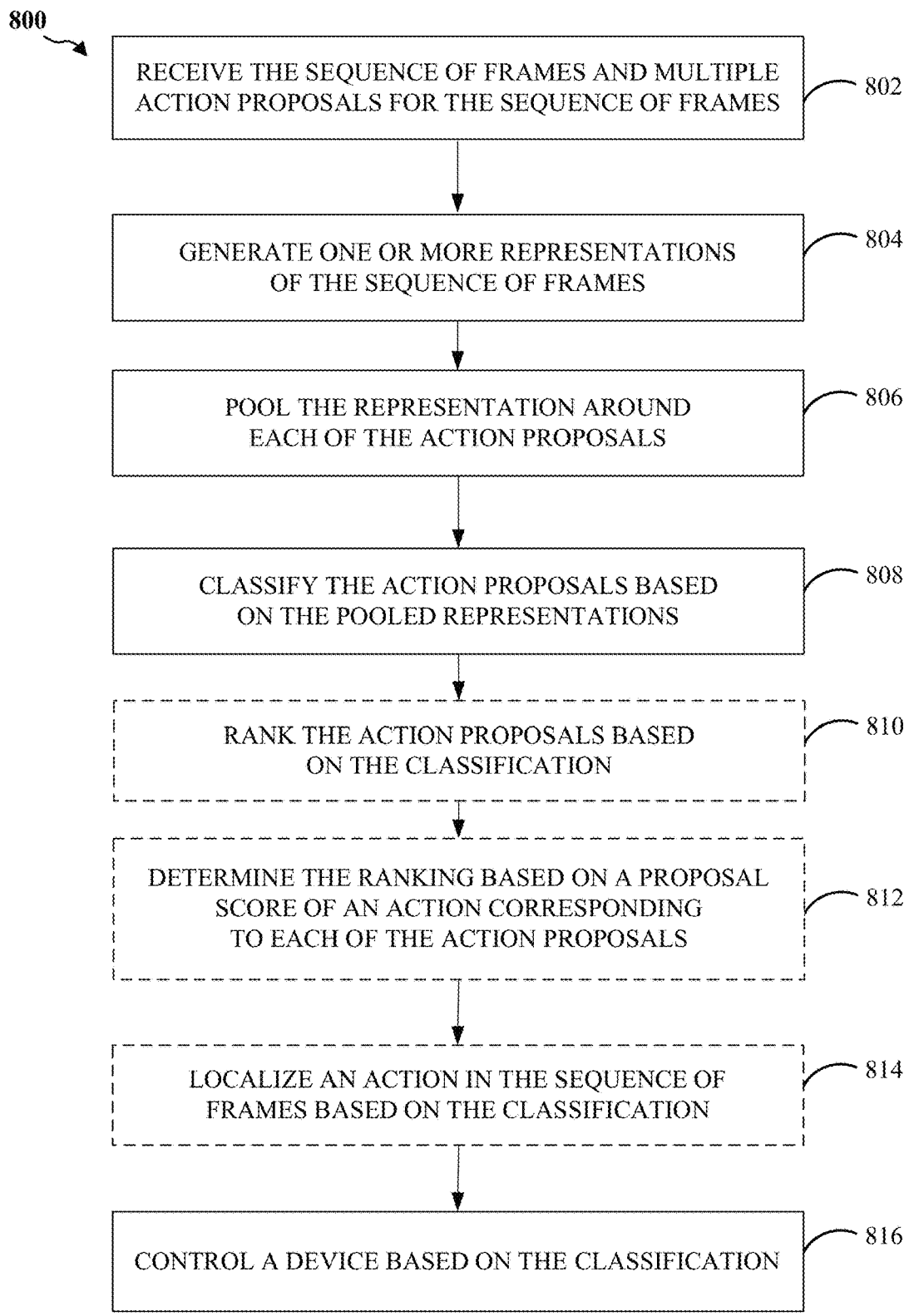
FIG. 8 illustrates a method for processing a sequence of frames according to an aspect of the present disclosure.

FIG. 8 illustrates a method 800 for processing a sequence of frames according to an aspect of the present disclosure. At block 802, an action proposal classification system receives the sequence of frames and multiple action proposals for the sequence of frames. The action proposals may be generated by an action proposal generator that is separate from, or included with, the action localization system. At block 804, the action proposal classification system generates one or more representations of the sequence of frames. The representations may include feature maps. The representations may also be referred to as activations.

The representations may be generated by a spatial temporal convolutional neural network. For example, the spatial temporal convolutional neural network may be a convolutional neural network, a three-dimensional convolutional neural network, or a convolutional long-short term memory convolutional neural network. The spatial temporal convolutional neural network may receive a red-green-blue input or an optical flow input. The spatial temporal convolutional neural network may be pre-trained on labeled videos or images without the use of ground-truth bounding boxes. The action localization system may be trained end-to-end. That is, weights and/or learnable parameters of the spatial temporal convolutional neural network and a classification layer may be updated during the training stage.

At block 806, the action proposal classification system pools the representation around each of the action proposals. The pooling may be performed at a proposal of an interest pooling layer that receives a vector of representations (e.g., activations). The vector may be received from the convolutional neural network. The video representations are pooled around the action proposals. For example, if the action proposals designate a gymnast as an area of interest, the interest pooling layer focuses only on the representations generated from the area corresponding to the gymnast. The pooling may be simple pooling, such as averaging or concatenation. Additionally, or alternatively, the pooling may be sophisticated, such as temporal pooling by the recurrent neural network.

At block 808, the action proposal classification system classifies the action proposals based on the pooled representations. In an optional configuration, at block 810, the action proposal classification system ranks the action proposals based on the classification. Furthermore, in another optional configuration, at block 812, the action proposal classification system determines the ranking based on a proposal score of an action corresponding to each of the action proposals. Each proposal score may be a confidence of an action proposal for an action class. That is, the proposal score of each action proposal is determined based on a correlation to an identified class of the sequence of frames. After ranking the action proposals, the action proposal classification system may, in an optional configuration, at block 814, localize an action in the sequence of frames based on the classification. The localization refers to identifying a location of an action of interest in the sequence of frames. The localization may be performed without the ranking.

At block 816, the action proposal classification system controls a device based on the classification. The device may be further controlled based on the localized action. For example, an autonomous vehicle (e.g., device) may receive a sequence of frames from a vision sensor (e.g., red-green-blue (RGB) camera). The action proposal classification system may classify an action of an actor in the sequence of frames. For example, the action proposal classification system may identify a person in the sequence of frames and classify the person's action as walking. The autonomous vehicle may perform an action based on the classification. For example, the autonomous vehicle may avoid an area with the walking person (e.g., pedestrian) or the autonomous vehicle may reduce its speed in the area with the pedestrian. The area with the pedestrian may be identified based on the localization of the action.

In some aspects, the method 800 may be performed by the SOC 100 (FIG. 1). That is, each of the elements of the method 800 may, for example, but without limitation, be performed by the SOC 100 or one or more processors (e.g., CPU 102) and/or other included components.

The various operations of methods described above may be performed by any suitable means capable of performing the corresponding functions. The means may include various hardware and/or software component(s) and/or module (s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for processing a sequence of frames, comprising:
    receiving the sequence of frames and a plurality of action proposals for the sequence of frames;
    generating a representation of the sequence of frames;
    pooling the representation around each action proposal of the plurality of action proposals by selectively applying at least one of average pooling, concatenation pooling, temporal pooling, or a combination thereof;
    classifying the plurality of action proposals based on the pooled representation; and
    controlling a device based on the classifying.

2. The method of claim 1, further comprising localizing an action in the sequence of frames based on the classifying.

3. The method of claim 1, further comprising ranking the plurality of action proposals based on the classifying.

4. The method of claim 3, further comprising determining the ranking based on a proposal score of an action corresponding to each action proposal of the plurality of action proposals.

5. The method of claim 4, in which the proposal score is determined based on a correlation to a class of interest for the sequence of frames.

6. The method of claim 1, further comprising generating the representation with a spatial temporal convolutional neural network comprising at least one of a convolutional neural network, a three-dimensional convolutional neural network, or a convolutional long-short term memory convolutional neural network.

7. The method of claim 6, in which the spatial temporal neural network receives a red-green-blue input or an optical flow input.

8. The method of claim 1, in which the representations comprise feature maps.

9. An apparatus for processing a sequence of frames, comprising:
    means for receiving the sequence of frames and a plurality of action proposals for the sequence of frames;
    means for generating a representation of the sequence of frames;
    means for pooling the representation around each action proposal of the plurality of action proposals by selectively applying at least one of average pooling, concatenation pooling, temporal pooling, or a combination thereof;
    means for classifying the plurality of action proposals based on the pooled representation; and
    means for controlling a device based on the classifying.

10. The apparatus of claim 9, further comprising means for localizing an action in the sequence of frames based on the classifying.

11. The apparatus of claim 9, further comprising means for ranking the plurality of action proposals based on the classifying.

12. The apparatus of claim 11, further comprising means for determining the ranking based on a proposal score of an action corresponding to each action proposal of the plurality of action proposals.

13. The apparatus of claim 12, in which the proposal score is determined based on a correlation to a class of interest for the sequence of frames.

14. The apparatus of claim 9, further comprising means for generating the representation with a spatial temporal convolutional neural network comprising at least one of a convolutional neural network, a three-dimensional convolutional neural network, or a convolutional long-short term memory convolutional neural network.

15. The apparatus of claim 14, in which the spatial temporal neural network receives a red-green-blue input or an optical flow input.

16. The apparatus of claim 9, in which the representations comprise feature maps.

17. An apparatus for processing a sequence of frames, the apparatus comprising:
    a memory; and
    at least one processor coupled to the memory, the at least one processor configured:
        to receive the sequence of frames and a plurality of action proposals for the sequence of frames;
        to generate a representation of the sequence of frames;
        to pool the representation around each action proposal of the plurality of action proposals by selectively applying at least one of average pooling, concatenation pooling, temporal pooling, or a combination thereof;
        to classify the plurality of action proposals based on the pooled representation; and
        to control a device based on the classification.

18. The apparatus of claim 17, in which the at least one processor is further configured to localize an action in the sequence of frames based on the classification.

19. The apparatus of claim 17, in which the at least one processor is further configured to rank the plurality of action proposals based on the classification.

20. The apparatus of claim 19, in which the at least one processor is further configured to determine the ranking based on a proposal score of an action corresponding to each action proposal of the plurality of action proposals.

21. The apparatus of claim 20, in which the proposal score is determined based on a correlation to a class of interest for the sequence of frames.

22. The apparatus of claim 17, in which the at least one processor is further configured to generate the representation with a spatial temporal convolutional neural network comprising at least one of a convolutional neural network, a three-dimensional convolutional neural network, or a convolutional long-short term memory convolutional neural network.

23. The apparatus of claim 22, in which the spatial temporal neural network receives a red-green-blue input or an optical flow input.

24. The apparatus of claim 17, in which the representations comprise feature maps.

25. A non-transitory computer-readable medium having program code recorded thereon for processing a sequence of frames, the program code executed by a processor and comprising:
   program code to receive the sequence of frames and a plurality of action proposals for the sequence of frames;
   program code to generate a representation of the sequence of frames;
   program code to pool the representation around each action proposal of the plurality of action proposals by selectively applying at least one of average pooling, concatenation pooling, temporal pooling, or a combination thereof;
   program code to classify the plurality of action proposals based on the pooled representation; and
   program code to control a device based on the classification.

26. The non-transitory computer-readable medium of claim 25, in which the program code further comprises program code to localize an action in the sequence of frames based on the classification.

27. The non-transitory computer-readable medium of claim 25, in which the program code further comprises program code to rank the plurality of action proposals based on the classification.

28. The non-transitory computer-readable medium of claim 27, in which the program code further comprises program code to determine the ranking based on a proposal score of an action corresponding to each action proposal of the plurality of action proposals.

29. The non-transitory computer-readable medium of claim 28, in which the proposal score is determined based on a correlation to a class of interest for the sequence of frames.

30. The non-transitory computer-readable medium of claim 25, in which the program code further comprises program code to generate the representation with a spatial temporal convolutional neural network comprising at least one of a convolutional neural network, a three-dimensional convolutional neural network, or a convolutional long-short term memory convolutional neural network.

* * * * *